A. KINGSBURY.
THRUST BEARING.
APPLICATION FILED JUNE 5, 1917.
1,260,686.
Patented Mar. 26, 1918.
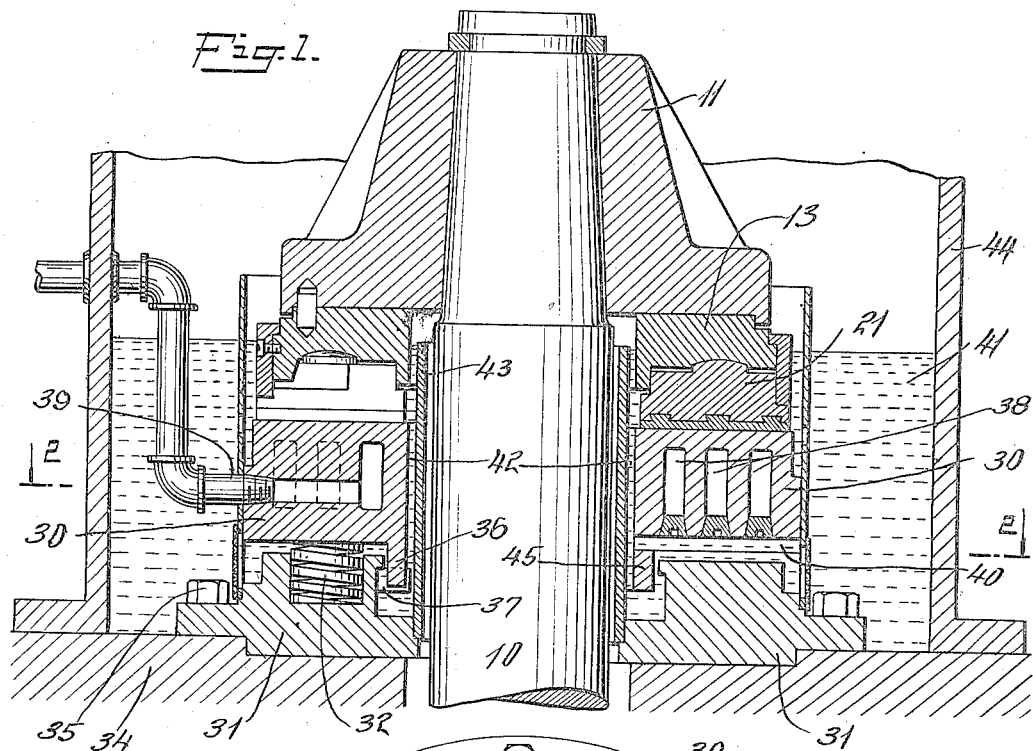
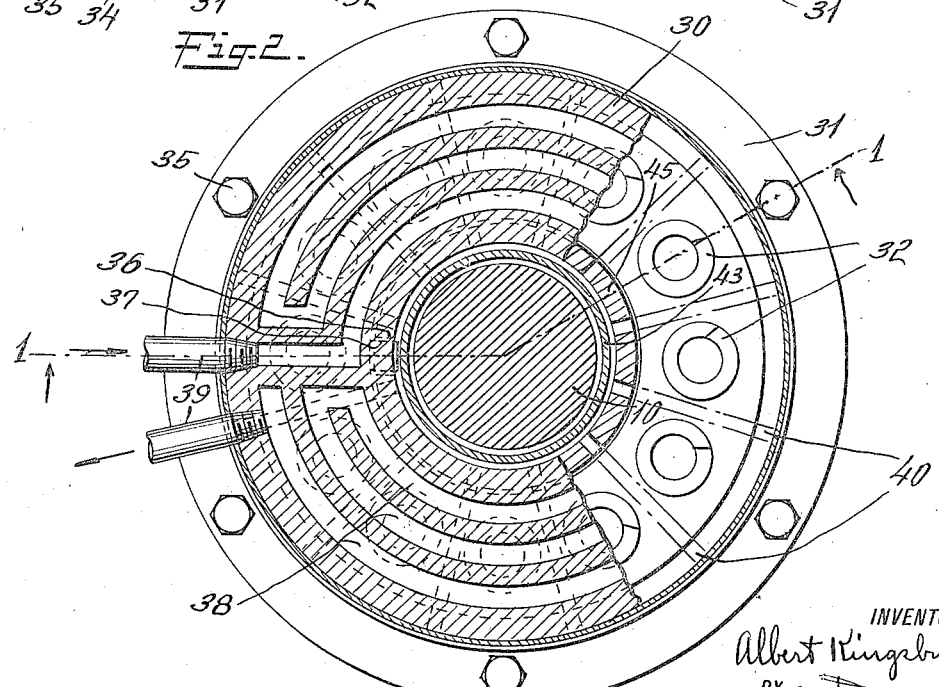
INVENTOR
Albert Kingsbury
BY
Marshall J. Sanborn
ATTORNEYS

UNITED STATES PATENT OFFICE.

ALBERT KINGSBURY, OF PITTSBURGH, PENNSYLVANIA.

THRUST-BEARING.

1,260,686.

Specification of Letters Patent.

Patented Mar. 26, 1918.

Original application filed February 26, 1916, Serial No. 80,569. Divided and this application filed June 5, 1917. Serial No. 172,860.

*To all whom it may concern:*

Be it known that I, ALBERT KINGSBURY, a citizen of the United States of America, and a resident of Pittsburgh, Allegheny county, and State of Pennsylvania, have invented certain new and useful Improvements in Thrust-Bearings, of which the following is a specification, reference being had to the following specification forming a part thereof.

My invention relates to thrust bearings and has special reference to such as comprise a plurality of tiltably mounted shoes and are adapted to sustain relatively high thrust pressures. One object of my invention is to provide a simple and durable bearing structure of the aforesaid character that shall comprise a plurality of tiltably mounted shoes, an annular bearing member coöperating therewith, and a resilient support for the annular bearing member.

In order that my invention may be thoroughly understood I will now proceed to describe the same in the following specification, and then point out the novel features thereof in appended claims.

Referring to the drawings:

Figure 1 is a sectional elevation on the line 1—1 of Fig. 2 of a bearing arranged and constructed in accordance with my invention and constituting an embodiment thereof.

Fig. 2 is a sectional plan view taken on the line 2—2 of Fig. 1.

The bearing illustrated comprises a shaft 10, a thrust block 11 secured thereto, a ring-shaped shoe plate or support 13 which is mounted on the thrust block, and a plurality of tiltable bearing shoes 21.

The bearing shoes coöperate with an annular thrust bearing member 30 which is supported from a base 31, by springs 32. The base has recesses 33 in which the springs 32 are disposed and is secured to a foundation designated 34 by bolts 35 or other suitable means. The annular bearing member 30 and the base 31 have coöperating lugs 36 and 37 to hold the bearing member 30 against rotation without interfering with its self-adjustment on the resilient support provided by the spring 32.

In the structure illustrated the bearing member 30 has circumferentially arranged slots 38 constituting passages for cooling fluid which is supplied through a pipe 39. The bearing member is, furthermore, provided with radial slots 40 to permit lubricating fluid to pass from the outer reservoir 41 into a narrow annular chamber 42. This chamber is formed by a sleeve 43 which is mounted on the base 31, close to the shaft and coöperates with an outer wheel or casing 44 in establishing an oil well in which the bearing members are disposed.

Extending downwardly from the bearing member 30 is an annular projection 45 which centers the ring relative to the base 31.

The springs 32 may be compressed which permits the ring to continually adjust itself to the surface of the shoes as they rotate and thus at all times distributes the thrust pressure upon the several shoes with substantial uniformity.

Attention is directed to the fact that this is accomplished without material friction and the structure is relatively simple and inexpensive.

The peripheral slots for the cooling fluid and the radial slots for the lubricating fluid are fully set forth and covered by my copending application Serial No. 80,569 filed February 26, 1916, of which this application is a division.

The bearing shoes may, of course be made relatively stationary and the annular bearing member 30 attached to the rotatable part of the bearing, if desired, and various modifications may be effected within the spirit and scope of my invention. I therefore intend only such limitations as are imposed by the appended claims.

What I claim is:

1. A thrust bearing comprising a thrust block, a plurality of bearing shoes tiltingly mounted thereon, a thrust collar coöperating with the shoes, and resilient means for supporting the thrust collar.

2. A thrust bearing comprising a thrust block, a plurality of bearing shoes tiltingly mounted thereon, a thrust collar coöperating with the shoes, and a plurality of springs for supporting the thrust collar.

3. A thrust bearing comprising a thrust block, a plurality of bearing shoes tiltingly mounted thereon, a thrust collar coöperating with the shoes, a base having spaced pockets, and a plurality of helical springs in the pockets for supporting the thrust collar.

4. A thrust bearing comprising two relatively rotatable members, a plurality of bearing shoes tiltably supported on one of said members and resilient means for supporting the other of said members.

5. A thrust bearing comprising two relatively rotatable members, a plurality of bearing shoes tiltably mounted on one of said members, a resilient support for the other of said members, and an annular oil chamber inclosing the bearing members and adapted to maintain a bath of lubricant above the level of the bearing surfaces.

In witness whereof, I have hereunto set my hand this 2nd day of June, 1917.

ALBERT KINGSBURY.